April 21, 1925.  1,534,864
G. G. OLIVER ET AL
APPARATUS FOR TEMPERING GLASSWARE
Original Filed Dec. 19, 1919  3 Sheets-Sheet 3
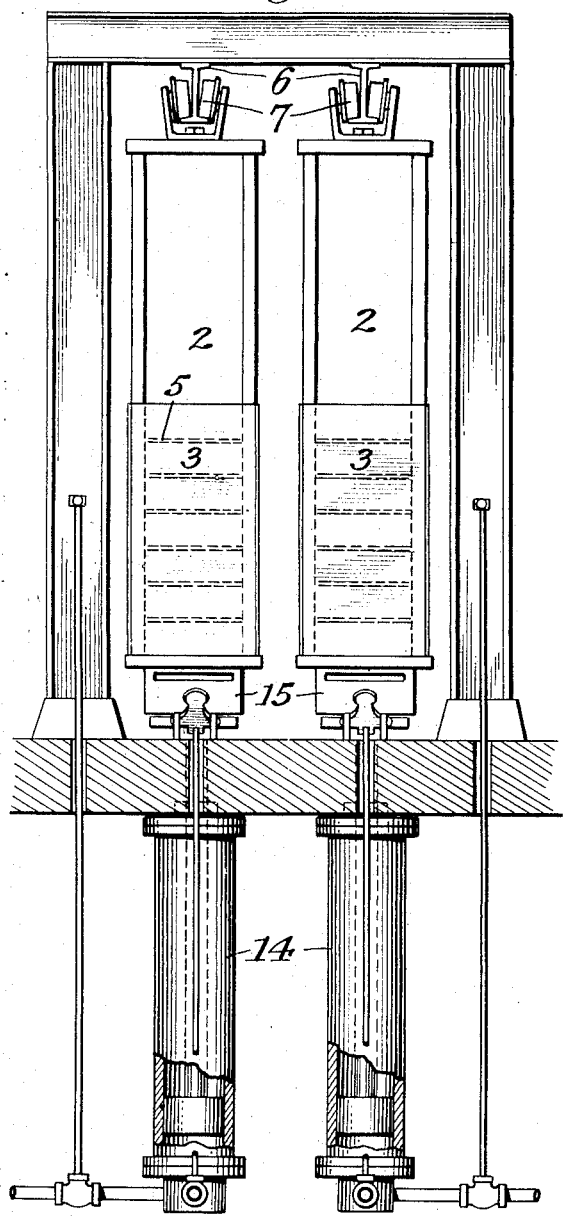
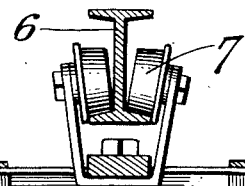
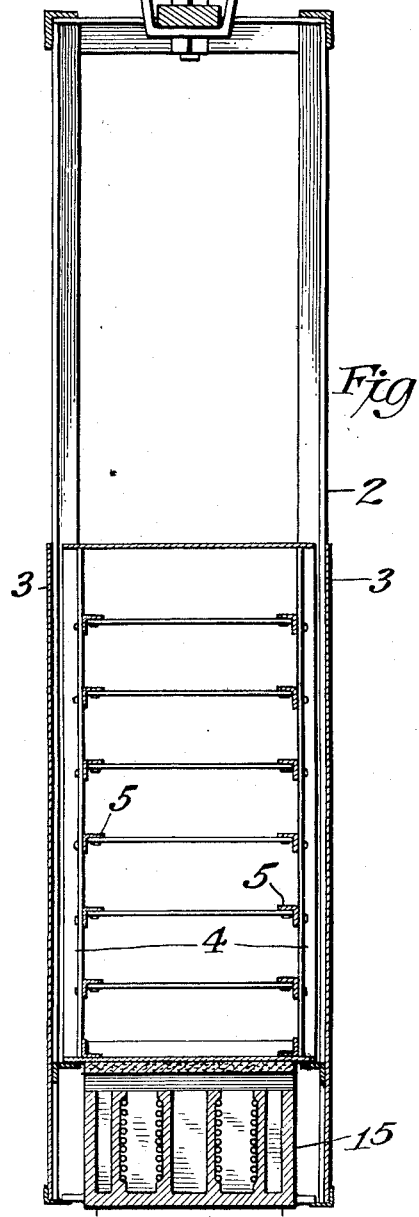
Inventor
George G. Oliver
and
Thomas Stenhouse
Clarence D. Kerr
By their Attorney Patented Apr. 21, 1925.

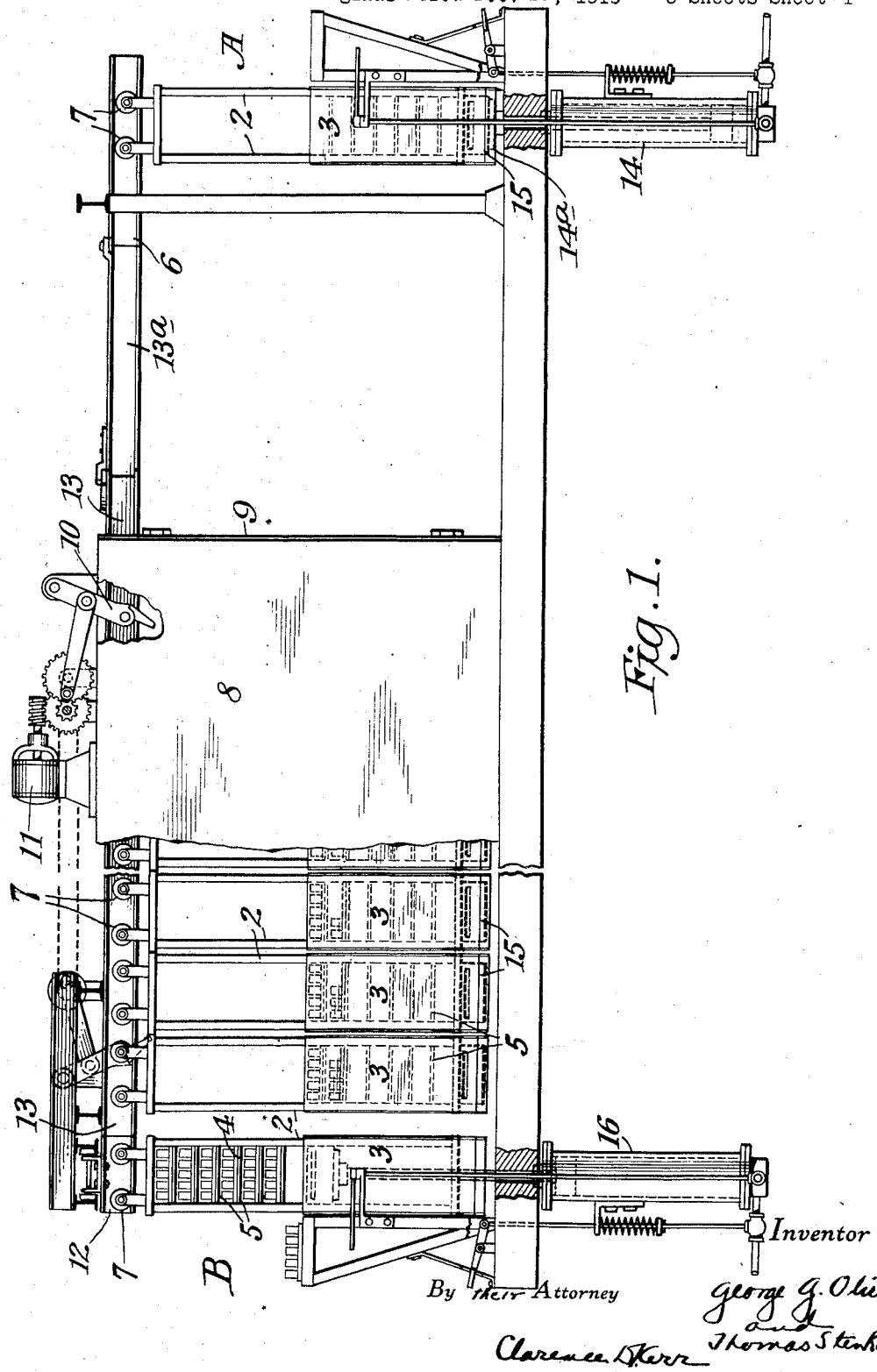

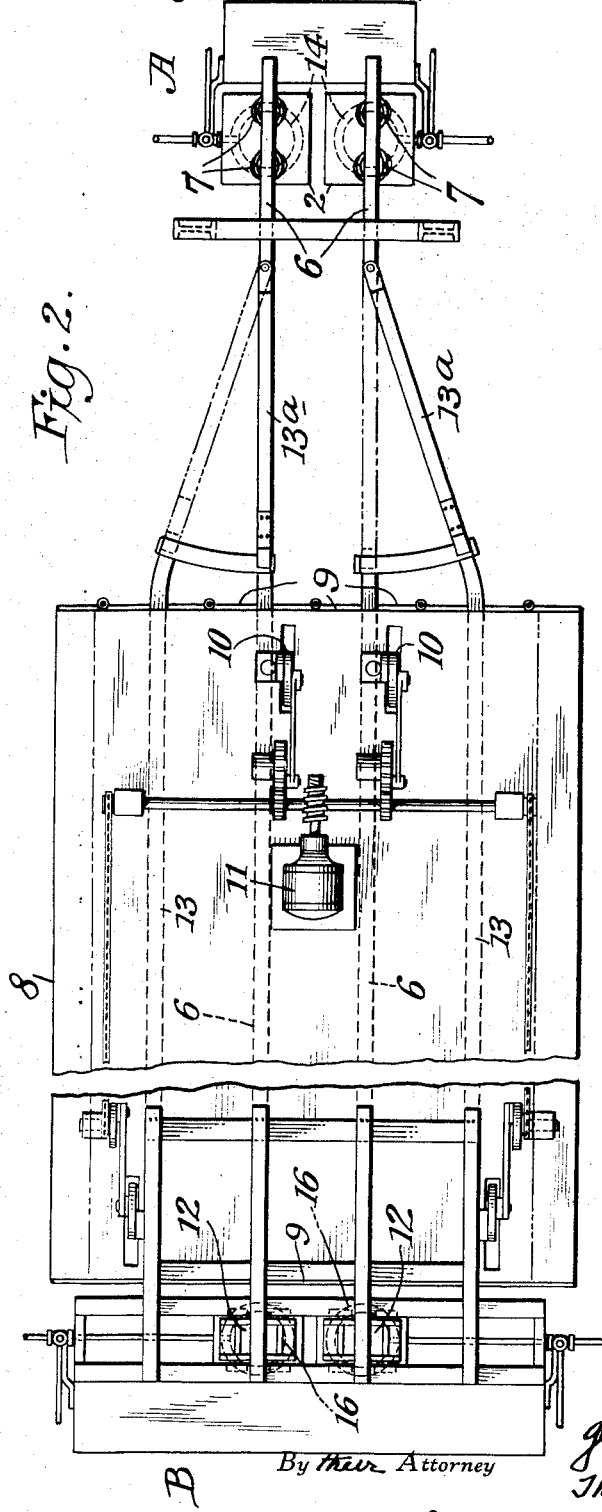

1,534,864

UNITED STATES PATENT OFFICE.

GEORGE G. OLIVER AND THOMAS STENHOUSE, OF WASHINGTON, PENNSYLVANIA, ASSIGNORS TO THE HAZEL-ATLAS GLASS COMPANY, OF WHEELING, WEST VIRGINIA, A CORPORATION OF WEST VIRGINIA.

APPARATUS FOR TEMPERING GLASSWARE.

Application filed December 19, 1919, Serial No. 346,022. Renewed March 17, 1924.

*To all whom it may concern:*

Be it known that we, GEORGE G. OLIVER and THOMAS STENHOUSE, citizens of the United States, residing at Washington, Washington County, Pennsylvania, have jointly invented new and useful Improvements in Apparatus for Tempering Glassware, of which the following is a specification, reference being had to the accompanying drawings, in which—

Fig. 1 is a side elevation showing our improved apparatus; Fig. 2 is a top plan view thereof; Fig. 3 is an end elevation thereof; and Fig. 4 is a detail of one of the receptacles for the glassware.

Our invention relates to the annealing of glassware and consists in providing apparatus conveniently arranged for transferring the glass from the forming machine to the packing room while it is being tempered and cooled. Our invention also consists in the features which we shall hereinafter describe and claim.

Referring to the drawings, the receptacles for the ware consist in an outer container 2 and an inner container 4. The outer container 2 preferably has a frame made of angle irons, is open at the top and bottom, and in its lower portion has closed side walls and may be lined with some insulating material to prevent dissipation of the heat of the ware. Within the container 2 is an inner container 4 which consists in a rectangular frame having shelves 5, is open front and rear and has closed sides top and bottom. The receptacles are supported by means of the wheels 7 mounted on the outer container, which engage an overhead rail 6 along which the receptacles are adapted to be moved from the loading station A to the unloading station B, passing through a chamber 8, in which the receptacles are allowed to remain a sufficient time for the tempering or cooling operation. The chamber 8 is of a construction adapted to retain the heat from the receptacles and is equipped at either end with doors 9 which open automatically for the ingress or egress of the receptacles. The receptacles are advanced through the annealing chamber 8 by means of a pusher or lever 10 operated by the motor 11, which engages the rear faces of the successive receptacles and advances them step by step toward the unloading station B.

At the unloading station B is a transfer carrier 12, in line with the rails 6, by which a receptacle when it has been unloaded may be shifted laterally out of the way to permit the succeeding receptacles to be moved into unloading position. The receptacles are returned from the transfer carrier 12 to the loading station along the rails 13 and switches 13ª.

At the loading station the operator by means of the cylinder hoist 14, the head 14ª of which engages the bottom of the inner container 4, brings the various shelves in the container 4 into position for loading, and as the loaded trays containing the ware are placed on the shelves, the container is lowered the height of one shelf at a time until all the shelves are loaded and its bottom rests on the angle irons at the bottom of the outer container 2, in which position the ware is wholly enclosed from the atmosphere by the sides 3 of the outer container 2 and by the top and bottom of the inner container 4. The hoist 14 is retracted and the loaded receptacle is then moved by hand or other means into the annealing chamber 8. We have shown a heating compartment 15 which may be attached to the bottom of each container 4 so that if desired the receptacles may be heated.

When the receptacle reaches the unloading position B, a cylinder hoist 16 is used to elevate the inner container 4 so that the trays may be removed for examination and sorting. When a receptacle is unloaded, the hoist 16 is retracted and the receptacle is pushed out of the way laterally along the transfer carrier 12 and returned along the switch 13 to the loading station A.

We have found that by the use of the apparatus just described, a very great saving in the storage capacity of the lehr is effected, and the labor cost greatly reduced, as one workman can attend to a number of machines with much less labor than in looking after a lehr of the old type. The transfer of the ware on a plurality of superimposed trays in closed receptacles serves not only to economize space, but also to conserve heat, and the use of the residual heat of the ware for annealing, augmented if desired by a heating unit, also results in a very considerable saving. Further, the ware after annealing is much more uniform in quality than the ware produced in lehrs of the ordinary type, due to the fact that the arrangement of the trays in closed receptacles prevents un-uniform cooling from air currents.

The terms and expressions which we have employed are used as terms of description and not of limitation, and we have no intention, in the use of such terms and expressions, of excluding any equivalents of the features shown and described, or portions thereof, but recognize that various structural modifications are possible within the scope of the invention claimed.

What we claim is:

1. In apparatus for annealing glassware, a receptacle comprising an inner container and an outer container, the inner container having a closed top and bottom and a series of shelves having open sides, and an outer container having closed walls open at top and bottom, the inner container being adapted, when filled with ware, to rest in the lower portion of said outer container, the side walls of the outer container and the top and bottom of the inner container comprising a complete closure for excluding air during annealing.

2. In apparatus for annealing glassware, a plurality of receptacles, each receptacle having an inner member arranged to contain a plurality of trays of glassware mounted one above the other, and slidable from either side for loading and unloading the glassware, each receptacle comprising means for substantially excluding the air from the glassware therein, during the annealing operation.

3. In apparatus for annealing glassware, a plurality of receptacles, each receptacle being adapted to contain a plurality of trays of glassware arranged one above the other, each receptacle comprising means for substantially excluding air from the glassware therein during the annealing operation, an overhead track upon which the receptacles are supported and transported, a loading station and an unloading station, and an annealing chamber intermediate said stations through which the units pass, and means for returning the units from the unloading to the loading station.

4. In apparatus for annealing glassware, a series of receptacles arranged for horizontal travel, a plurality of trays in each receptacle arranged one above the other, each tray providing room for a number of articles of glassware, an overhead track upon which the receptacles are supported and transported while being annealed, a loading and an unloading station, a switch track and a transferring mechanism upon which the receptacles are returned from the unloading station to the loading station.

5. In apparatus for annealing glassware, a receptacle consisting of an open ended container having portions of its sides closed, and a support within the receptacle for a plurality of trays of glassware having closed ends, the support being movable relatively to the container into receiving and discharging position and means for moving the support into receiving, annealing and discharging positions.

6. In apparatus for annealing glassware, a plurality of receptacles, each receptacle being adapted to contain a plurality of trays of glassware arranged one above the other, each receptacle being equipped with unitary heating means as a component thereof, a loading station and an unloading station, and means for transferring the receptacles from the loading to the unloading station.

7. In apparatus for annealing glassware, a receptacle adapted to contain a plurality of trays of glassware arranged one above the other, and comprising a container, a heater attached to the container, and a removable closure adapted to enclose both container and heater, the closure being movable relatively to the container and heater for loading and unloading.

8. In apparatus for annealing articles of glassware, a series of telescoping receptacles, adapted to contain a plurality of articles of glassware, an overhead track upon which the receptacles are supported and transported, a loading station and an unloading station, and an annealing chamber intermediate said stations, through which the units pass, and means for returning the units from the unloading station.

9. In apparatus for annealing articles of glassware, a series of telescopic receptacles, each adapted to contain a plurality of articles of glassware, an overhead track upon which the receptacles are supported and transported, a loading station, and an unloading station, a switch track, and a lateral transferring mechanism, upon which the receptacles are transferred to the switch track for the return to the loading station.

10. In apparatus for annealing glassware, a telescopic receptacle adapted to contain a plurality of trays of glassware, arranged one above the other, a heater attached to the container, and a closure being movable relatively to the container and heater for loading and unloading.

11. In apparatus for annealing glassware, a plurality of receptacles, each receptacle being adapted to contain a plurality of trays of glassware arranged one above the other, each receptacle comprising a substantially rectangular frame suspended from an overhead track by which the receptacles are supported and transported, entrance, annealing and discharge stations through which the units pass, and pusher mechanism which engages the successive receptacles and advances them step by step through successive stations toward the discharge station.

GEORGE G. OLIVER.
THOMAS STENHOUSE.